United States Patent [19]
Fletcher et al.

[11] 3,952,083
[45] Apr. 20, 1976

[54] SILICA REUSABLE SURFACE INSULATION

[76] Inventors: James C. Fletcher, Administrator of the National Aeronautics and Space Administration, with respect to an invention of Howard E. Goldstein, Saratoga, Calif.; Marnell Smith; Daniel Leiser, both of San Jose, Calif.

[22] Filed: Dec. 26, 1973

[21] Appl. No.: 427,775

[52] U.S. Cl. .................................. 264/63; 264/60; 264/66
[51] Int. Cl.² ...................... F27D 7/04; C04B 35/14
[58] Field of Search ...................... 264/60, 63, 66; 259/81 A

[56] References Cited
UNITED STATES PATENTS

| | | | |
|---|---|---|---|
| 2,847,314 | 8/1958 | Fisher | 264/63 |
| 3,549,473 | 12/1970 | Le Blanc et al. | 264/63 |
| 3,702,279 | 9/1972 | Ardary et al. | 264/60 |

OTHER PUBLICATIONS

"An Analysis of Solids–Solids Blenders," Patterson P. Kelly Advertising circular, Nov. 1, 1967.

*Primary Examiner*—Robert F. White
*Assistant Examiner*—John Parrish
*Attorney, Agent, or Firm*—Darrell G. Brekke; Armand G. Morin, Sr.; John R. Manning

[57] ABSTRACT

A reusable silica surface insulation (RSI) material is provided by bonding amorphous silica fibers with colloidal silica at an elevated temperature. The surface insulation is ordinarily manufactured in the form of blocks (i.e., tiles).

6 Claims, 1 Drawing Figure

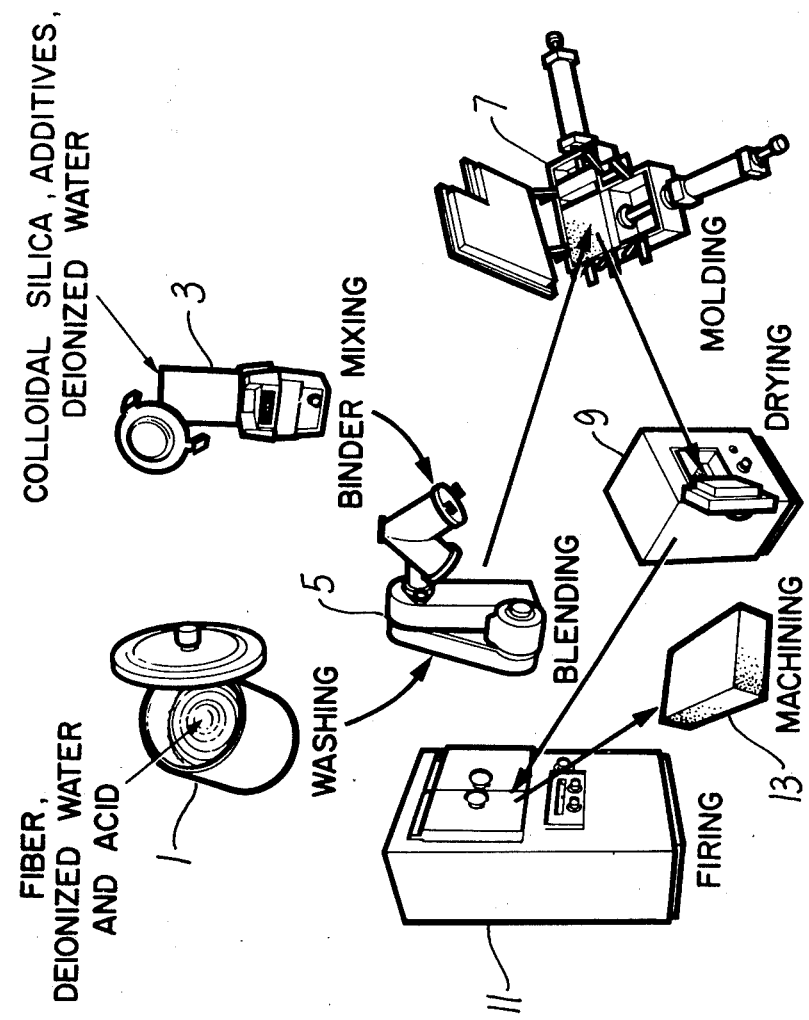

SILICA REUSABLE SURFACE INSULATION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

Insulating tiles which are reusable and suitable for use at high temperatures.

2. Description of the Prior Art

In the past, reusable surface insulation materials have been formed by bonding ceramic fibers with an inorganic binder. Among the fibers used have been silica, mullite, alumino silicate and zirconia. A large variety of binders has been used, including organometallic precursors, colloidal oxides and finely divided glasses. The RSI materials are furnace cured to obtain the desired properties.

The prior art composition suffer from a number of disadvantages. The currently available silica reusable surface insulation materials are made by a very complex process that requires from two to four weeks in production. The material of the present invention can be made in three days. Furthermore, the mechanical properties and/or thermal stability of the prior art materials are inferior to those of the present invention.

The materials of the present invention are superior to the prior art materials in that they are less expensive, require less time to fabricate and have superior mechanical and/or thermal properties.

BRIEF DESCRIPTION OF THE DRAWINGS

The sole FIGURE of the drawing is a pictorial diagram showing the steps necessary for preparing insulating materials in accordance with the present invention.

DESCRIPTION OF THE PREFERRED EMBODIMENTS

The insulation material of the present invention is fabricated utilizing high purity silica fibers, colloidal (fumed) silica as a binder and reagent grade starch as a temporary binder. Tiles or other desired shapes can be made having densities of from 7 to 30 pounds per cubic foot. The silica fiber and silica binder are selected so that they will be stable with respect to devitrification at temperatures over 2000°F for long periods of time. The starch must be pure in order not to leave a residue which would contaminate the finished product, but, as will be later apparent, it is burned out during a processing step and does not form a part of the finished composition. The final composition preferably contains from 95 to 98% of silica fibers with the balance being colloidal silica binder.

Various raw materials can be utilized in practicing the invention and one suitable form of silica fiber is that known as Microquartz 108 fiber manufactured by Johns Manville, which is at least 98.5% pure silica. Another suitable starting material is the high purity silica fiber made by Hitco Company of Gardena, California and sold under the name Refrasil.

The most important characteristic of the fiber is its chemical composition. It is desirable that the fiber not have a total bulk impurity content greater than 0.3% and the total alkali and alkaline earth content should be below 0.06%. The fibers are usually treated to remove surface impurities by washing alternately in hydrochloric acid (pH=3) and deionized water. This treatment generally has a small effect on bulk chemical composition. The small quantities of impurities removed have a significant effect on devitrification and shrinkage with some fiber lots, however. Average fiber diameter diamater of the Microquartz 108 fiber is 1 to 2.5 microns. Larger fibers up to 6 microns can also be used. Fiber length should be less than ¼ inch, or stratification, during molding, and cracking of the resulting tile may occur. If the fiber is too long for efficient use, it is chopped before use.

The quantity of fiber, relative to the quantity of colloidal silica can be varied through a rather broad range with satisfactory results. For a quantity of fiber of from 200 to 400 gms, it has been found suitable to use from 1,000 to 3,000 gms. of binder solution which consists of 0.5 to 1.0% colloidal silica, 0.025% to 1% reagent grade starch and 1 to 5 ml. ammonia.

The binder solution is dispersed in a high speed mixer and then blended with the drained fibers and water in a V-blender for 30 minutes. The pH is adjusted to 9.0 with ammonia. An intensifier bar in the V-blender is used to break up fiber clumps. The use of the V-blender with an intensifier bar is unique to this invention. It allows use of a relatively viscous slurry, and gives a better fiber dispersion than other mixing methods. The resulting superior material is largely due to this mixing process. The slurry is poured into a mold for either single direction or multi-direction pressing and rapidly pressed at 10–20 psi. Final tile density is controlled by fiber content and molded dimensions and may vary from 7 to 30 lb/ft$^3$. Great care must be taken to avoid contamination of the raw materials during the process. All utensils and mixing vessels are polyethylene or stainless steel and only deionized water is used in any step in the process. The tile is then dried in an oven for 18 hours. The temperature is raised at the rate of 20F per hour to a maximum temperature of 300°F and held for the remainder of the cycle. The tile is taken directly from the drying oven and placed in the firing furnace and fired. A furnace must be used that has no alkali or alkaline earth oxide impurities in the vicinity of the tile being fired. A temperature rise rate of 300°F/hr. or less is required to avoid cracking and warping the 6 × 6 × 3 inch tiles. For larger tiles, slower heating may be required. The time-at-temperature and the exact maximum firing temperature are dependent on the fiber used. Less stable fiber lots are fired for shorter time and at a lower temperature. Shrinkage of each fiber lot differs during processing and requires different initial as-cast densities in order to obtain the same final tile density. Maximum firing temperature varies from 2200°F to 2400'F. The firing cycle allows sufficient time for sintering and stabilization relative to shrinkage while not allowing excessive shrinkage or any deviation of the tile. The starch burns out at a temperature of about 800°F, leaving a pure silica unbonded structure. At about 2300°F fiber-to-fiber sintering occurs at a fairly rapid rate. It appears that the final tile properties are determined by fiber-to-fiber sintering at least as much as they are by fiber-to-binder sintering. Shrinkage and sintering during firing are much more rapid with binder than without, allowing shorter firing times and thus, increasing long-term stability of the tile. In general, shrinkage during firing is 25–45% by volume. Warpage during firing can be a significant problem because the tile has essentially no strength at the firing temperature. Temperature gradients in the tile are likely to cause warping. Warping can also occur due to sagging of an unsupported tile during firing.

After firing, the tiles are machined to obtain exact dimensions. Usually about 0.5 cm of material is machined off.

Frequently, it is desirable to modify the optical properties of the tile and this can be accomplished by adding an impregant to the slurry in concentrations of 0.1 to 2% solids. The impregnant should be finally divided and preferably is smaller than 300 mesh. Various oxides such as chromium and cobalt oxide as well as silicon carbide can be used.

The binder is a finely divided silica. The material sold under the trade name CAB-O-SIL M5 by the Cabot Corporation has been found suitable. CAB-O-SIL M5 is a colloidal silica prepared by a vapor phase hydrolysis of silicon tetrachloride. It has high chemical purity, low water content, an enormous external surface area and a high degree of particle separation. Because of these properties, it functions in extremely small quantities as a binder in forming the insulation of the present invention.

Any purified starch can be used in carrying out the invention and it is normally preferred to use chemically pure reagent grade starch.

The steps in carrying out the present invention are shown in the drawing. Great care must be taken to avoid contamination of the raw materials during the process and all of the utensils and mixing vessels are polyethylene or stainless steel and only deionized water is used in any step of the process. The fibers are first washed in a drum 1 with hydrochloric acid for about one hour at a pH of 3 using pure nitrogen as the agitating agent. This is done several times until the fiber is sufficiently clean. At the same time the binder solution, which consists of amorphous silica, starch and water, is prepared in a mixer 3 and the fibers and the binder are added together and blended thoroughly in a blender 5 as a very viscous slurry. After blending, the materials are shaped in a mold 7 and then dried in oven 9. The dry tiles are then fired in kiln 11 for the required length of time and temperature to produce the finished tiles 13. The tiles are then machined to a desired size and shape.

The following non-limiting examples illustrate preferred embodiments of the present invention.

EXAMPLE 1

In accordance with this example, tiles 5 × 5 × 1¾ inches having a density of 15 pounds per cubic foot were produced. About 260 grams of Microquartz 108 fiber were placed in a polyethylene barrel with 8 gallons of deionized water and 10 to 20 ml. of hydrochloric acid were added to bring the pH to about 3. Pure nitrogen was bubbled through the mixture to agitate the fiber and aid in the washing. Washing was continued for 2 hours. The acidic water was drained off and fresh deionized water was added and the mixture again agitated with pure nitrogen for 10 minutes. This process was repeated until the rinse water had a pH of about 6, which ordinarily requires 3 rinses.

In a separate vessel, the binder was prepared by combining 20 grams of reagent grade starch, 30 grams of CAB-O-SIL M5 and 2 ml $NH_4OH$ and 1,000 grams deionized water; the binder was mixed for 2 minutes in a suitable mixer such as a Waring blender. The wet fiber and binder slurry were combined in a stainless steel twin shell V-blender having 8 quart capacity. Deionized water was added to bring the total water to 7,000 grams. The ingredients were mixed for 30 minutes with the blender running on a 5-minute-on and 5-minute-off cycle. The slurry was then transferred to a mold and pressed to a 6 × 6 × 2¼ inches tile at a pressure of 10–20 psi. The bottom and sides of the mold were perforated and covered with a 200 mesh stainless steel screen to allow excess water to flow out. The tiles were then dried in a drying oven on an 18-hour cycle beginning at a temperature of 50°F for one hour which was increased at a rate of 20°F per hour to 220°F and held for four hours and the temperature then raised 20° per hour to 300°F and maintained at this temperature until the tiles were placed in a curing furnace. In the furnace the curing cycle was 300°F per hour to 2300°F, held 2½ hours, lowered 300°F per hour to 1800°F when the furnace was turned off and allowed to cool to 300°F. The total firing time was 24 hours. The tile was now machined from 5¼ × 5¼ × 2 inches in accordance with usual machining practice to the desired size.

EXAMPLE II

In accordance with this example, a similar tile was made except that the density was 9 pounds per cubic foot. The starting materials were 300 grams of Microquartz 108 washed in the same manner as Example I and the binder was 30 grams of reagent grade starch, 50 grams CAB-O-SIL M5 and 2 ml $NH_4OH$. This mixture was added to 1,000 grams deionized water and mixed for 2 minutes.

The materials were combined in twin shell V-Blender; deionized water was added to bring the total water to 8,000 grams; the wet fiber was mixed in the same manner as Example 1. The slurry was then pressed in a 7 × 7 × 2¾ inches mold and dried in the same manner as in Example 1. The curing cycle was 300°F per hour to 2350°F, held for 1½ hours lowered 300° per hour to 1800°F and the furnace was turned off. After cooling as in Example 1, the tile was 6¼ × 6¼ × 2¼ inches and was then machined to a 6 × 6 × 2 inches final size.

EXAMPLE III

A tile having a density of 12½ pounds per cubic foot was prepared which contained silicon crabide opacifier.

One thousand grams of Microquartz 108 fiber was washed in 15 gallons of deionized water and 40–50 ml HCl and rinsed as in Example 1. In a separate vessel 100 grams starch, 175 grams CAB-O-SIL M5 and 25 grams SiC (300 mesh) and 4 ml $NH_4OH$ in 300 grams of deionized water were mixed in a blender. The mixing was continued for 4 minutes. The wet fiber and the binder-opacifier slurry were placed in a stainless steel "intensifier" twin-shell V-blender having a one-cubic-foot capacity. Deionized water was added to bring the total up to 25,000 grams. The ingredients were mixed for 45 minutes with the intensifier running on a 5-minute-on, 5-minute-off cycle. The slurry was then pressed in a 10½ × 10½ × 4 inches mold and dried as in Example 1. The tile was cured by placing the material in furnace and increasing the temperature by 200°F per hour to 2350°F, holding for 2 hours, lowering 200° per hour to 1800°F and turning the furnace off. When the furnace had cooled to about 500°F, the tile was removed. It was then machined to 9 × 9 × 3 inches.

EXAMPLE IV

In this example, a tile having a density of 15 pounds per cubic foot was made to demonstrate reimpregnation of the tile with binder. The process of Example 1 was repeated except that 240 grams of microquartz fiber was used with a binder consisting of 90 grams CAB-O-SIL, 2 ml NH$_4$OH, 20 grams starch and 3,000 grams of deionized water. The curing cycle was 300°F per hour to 2250°F, held for 1½ hours, lowered 300°F per hour to 1800°F and the furnace turned off. The tile was removed when the furnace temperature was below 500°F.

The tile was then machined to 5¼ × 5¼ × 2 inches and placed in a mixture of 3,000 grams deionized water, 90 grams CAB-O-SIL and 2 ml NH$_4$OH and vacuum was applied (29 inches Hg) for 30 minutes. The tile was dried and cured as described in Example 1. The tile was then trimmed to 5 × 5 × 1¾ inches. The result was a tile with similar strength to the tile of Example 1 but with a higher modulus of elasticity.

Although certain specific quantities and operating conditions have been given, it will be obvious to those skilled in the art that many variations can be made in the examples shown without departing from the spirit of the invention.

We claim:

1. A method of making a reusable silica surface insulation material comprising the steps of:
   a. forming a slurry of silica fibers and a binder comprising colloidal silica, starch and water by mixing said slurry for 30 minutes in a twin-shell V-blender equipped with an intensifier bar, said silica fiber comprising less than 0.06% by weight of alkali and alkaline earth impurities,
   b. molding said slurry into a tile at a pressure of 10–20 lbs. per square inch,
   c. drying said tile on an 18 hour cycle up to a temperature of 300°F., and
   d. firing said tile according to a curing cycle comprising:
      1. heating said tile in a furnace at the rate of 200°F. to 300°F. per hour to a maximum temperature of 2250°F. to 2350°F.,
      2. holding said tile at said maximum temperature for 1½ to 2½ hours,
      3. lowering the temperature at the rate of 200°F. to 300°F. per hour to a temperature of 1800°F., turning off the furnace and allowing the tile to cool to 300°F.–500°F. before removing the tile from the furnace, said firing step providing a tile consisting of 95 to 98% by weight silica fibers and 2 to 5% by weight colloidal silica binder, and
      4. machining the tile to the desired dimensions.

2. The process of claim 1 wherein said silica fibers are acid washed and neutralized prior to mixture with the said binder.

3. The process of claim 1 wherein the tiles are dried at a heating rate of 20°F/hr. to 220°F, held for approximately 4 hours, and then the temperature is raised at 20°F/hr. to 300°F where the tile is dried for about 10 hours.

4. The method of claim 1 wherein the silica fibers are less than ¼ inch in length.

5. The method of claim 1 wherein the amount of colloidal silica dispersed in the said slurry ranges from 1.25% to 15% by weight based on the weight of silica fibers.

6. A method of making a reusable silica surface insulation material comprising the steps of:
   a. washing silica fibers for 2 hours in a dilute Hcl solution at pH3, said fibers comprising less than 0.06% by weight of alkali and alkaline earth impurities,
   b. washing the fibers in (a) in deionized water until the pH is at least 6,
   c. preparing a binder by mixing colloidal silica, starch, and ammonical deionized water,
   d. blending the fibers of (b) with the binder in (c) to form a slurry,
   e. mixing the blend (d) for 30 minutes in a twin-shell V-blender equipped with an intensifier bar,
   f. molding said slurry into the shape of a tile at a pressure of 10–20 lbs. per square inch,
   g. drying said tile on an 18 hour cycle up to a temperature of 300°F., and
   h. firing said tile in accordance with a curing cycle which comprises:
      1. heating said tile in a furnace at the rate of 200°F. to 300°F. per hour to a maximum temperature of 2250°F. to 2350°F.,
      2. holding said tile at said maximum temperature for 1½ to 2½ hours,
      3. lowering the temperature at the rate of 200°F. to 300°F. per hour to a temperature of 1800°F., turning off the furnace and allowing the tile to cool to 300°F.–500°F. before removing the tile from the furnace, said firing step providing a tile consisting of 95 to 98% by weight silica fibers and 2 to 5% by weight colloidal silica binder, and
      4. machining the tile to the desired dimensions.

* * * * *